Aug. 3, 1965   R. L. JAMES   3,198,956
PULSE FORMING CIRCUIT
Filed Nov. 16, 1961
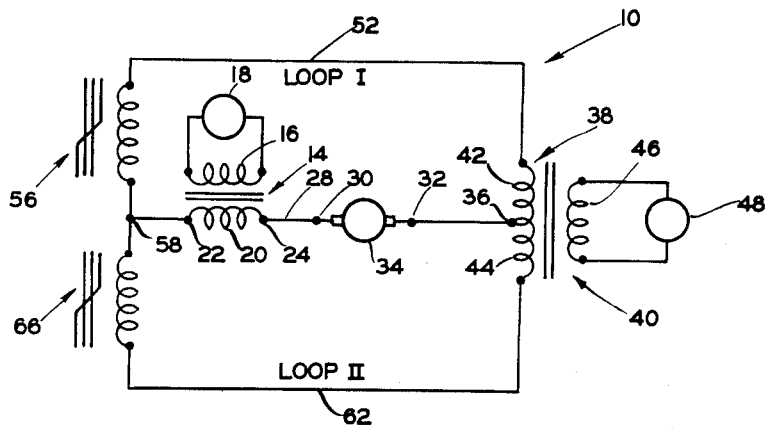
FIG. 1
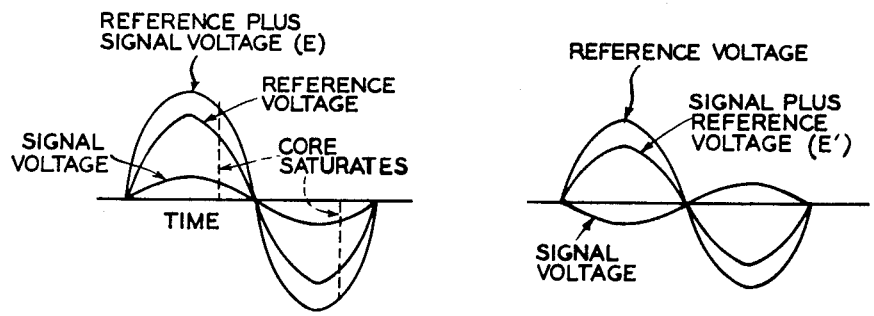
FIG. 2a
FIG. 2b
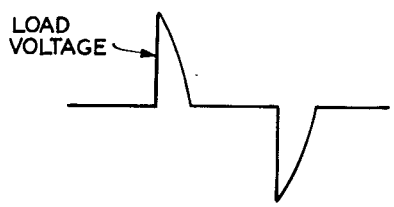
FIG. 2c
INVENTOR.
ROBERT L. JAMES
BY
ATTORNEY

United States Patent Office 3,198,956
Patented Aug. 3, 1965

3,198,956
PULSE FORMING CIRCUIT
Robert L. James, Bloomfield, N.J., assignor to The Bendix Corporation, Teterboro, N.J., a corporation of Delaware
Filed Nov. 16, 1961, Ser. No. 152,863
13 Claims. (Cl. 307—88)

This invention relates to pulse forming circuits and more particularly to a circuit for forming pulses in accordance with a signal.

One object of the invention is to provide a circuit which produces pulses in response to a signal and in which the time of occurrence of the pulses corresponds to the amplitude of the signal.

Another object of the invention is to provide a circuit which produces pulses in response to a signal and in which the width or period of occurrence of the pulses corresponds to the amplitude of the signal.

Another object of the invention is to provide a circuit which produces pulses in response to a signal and in which the time and period of occurrence of the pulses corresponds to the amplitude of the signal.

Another object of the invention is to provide a pulse forming circuit which is unaffected by changes in amplitude or frequency of a reference source.

Another object of the invention is to generate firing pulses corresponding to the amplitude of a signal and which are especially adapted for use with controlled rectifiers.

Another object of the invention is to provide a pulse forming circuit which is small in size, light in weight and reliable in operation.

The invention contemplates a circuit for forming pulses in accordance with a signal comprising a saturable reactor adapted to be energized by an alternating reference voltage and by a signal for energizing the reactor to saturate the reactor for a period or at a time in each half cycle in accordance with the signal.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawings:

FIGURE 1 is a schematic diagram of a pulse forming circuit constructed according to the invention, and, FIGURES 2a and 2b are voltage verses time graphs showing energization of the reactors and FIG. 2c shows the formation of pulses in response to a signal.

Referring now to the drawing and more particularly to FIGURE 1, the novel pulse forming network 10 comprises a pair of saturable reactors 56 and 66 connected in series with the center-tapped secondary winding 38 of a transformer 40. Primary winding 46 of transformer 40 is energized by an alternating reference signal source 48. A transformer 14 has its secondary winding 20 connected in series with a load, such as a motor 34, between the center tap 36 of secondary winding 38 and a point 58 between recators 56 and 66. Primary winding 16 of transformer 14 is energized by an alternating signal source 18. The reference voltage is connected to reactors 56 and 66 to energize the reactors in the same phase relationship and the signal voltage is connected to reactors 56 and 66 to energize the reactors in phase opposition.

The circuit including motor 34, transformer secondary winding 20, reactor 56 and a portion 42 of secondary winding 38 of transformer 40 is hereinafter referred to as loop I, and the circuit including motor 34, transformer secondary winding 20, reactor 66 and a portion 44 of secondary winding 38 is hereinafter referred to as loop II.

In one mode of operation reference voltage source 48 just saturates reactors 56 and 66 at the end of each half cycle in the absence of signal voltage from source 18. Under these conditions the circuit is balanced and no current flows through lead 34. When a signal is applied from source 18 to reactors 56 and 66 the signal is in-phase with the reference voltage across one of the reactors and 180° out-of-phase with the reference voltage across the other reactor. The in-phase voltage across the one reactor causes the associated reactor to saturate earlier in each half cycle than heretofore, allowing current flow through the reactor for the remainder of the half-cycle after saturation. The other reactor is unsaturated and blocks current flow. This unbalances the circuit and causes current flow through load 34 in accordance with the amplitude of the signal.

More specifically, as shown in FIGURE 2a of the drawing, when the signal voltage and reference voltage are in-phase and add in reactor 56 to provide a voltage E during one-half cycle, current flows in loop I as shown in FIG. 2c after reactor 56 is saturated and this period of current flow is determined by the amplitude of the signal. During the next half cycle the signal voltage again adds to the reference voltage and current again flows in loop I after saturation of reactor 56.

Since the signal voltage is applied in reactor 66 in opposition to the reference voltage during the first half cycle the signal subtracts from the reference voltage as shown at E' in FIG. 2b and reactor 66 does not saturate and no current flows in loop II. The same condition exists during the second half cycle. The difference in current flow in loops I and II shown in FIG. 2c energizes the load with a current of one phase.

When the signal is reversed in phase relative to the reference voltage, then loop II conducts in each half cycle after saturation of reactor 66 and loop I is nonconductive. Under these conditions the load is energized by current of opposite phase.

With the arrangement described, when the current is balanced and no current flows through the load, a change in amplitude or frequency of the reference source will not unbalance the circuit since it equally affects magnetization of both reactors. In some instances it may be desirable to increase the sensitivity of the circuit by energizing the reactors substantially above saturation so that a signal causes the load to be energized differentially, that is, the periods of saturation of the reactors during each half cycle will be changed differentially. One reactor will saturate earlier than heretofore in each half-cycle so that the period of saturation of one reactor will be increased and the period of saturation of the other reactor will be decreased. This differential change in saturation periods of the reactors unbalances the circuit and causes current flow through the load determined by the relative phases of the signal and reference voltages.

The pulse forming circuit described herein and constructed according to the invention produces pulses in response to a signal and the time and period of occurrence of the pulses corresponds to the amplitude of the signal. The circuit operation is relatively unaffected by changes in amplitude or frequency of the source. The pulse forming circuit is small in size, light in weight, and reliable in operation and is especially adapted for generating firing pulses for use with controlled rectifiers.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art. While the invention described may be used with sinusoidal signal and reference voltages it is not essential that sinusoidal voltages be used as long as the signal and reference voltages vary cyclically. In some instances it may be desirable to use voltages of square wave form.

What is claimed is:

1. A circuit for providing an output in accordance with a signal comprising a pair of saturable reactors, a center-tapped alternating reference source connected in series with the saturable reactors, and a source of signal voltage and an output connected between the center tap of the reference source and a point between the reactors for cooperating with the reference source to saturate one of the reactors in each half cycle to provide an output in accordance with the signal.

2. A circuit for providing an output in accordance with a signal comprising a pair of saturable reactors, a center-tapped alternating reference source connected in series with the saturable reactors, and a source of signal voltage and a load connected between the center tap of the reference source and a point between the reactors for cooperating with the reference source to saturate one of the reactors in each half cycle to energize the load in accordance with the signal.

3. A circuit for forming pulses in accordance with a signal comprising a pair of saturable reactors, a center-tapped alternating reference source connected in series with the saturable reactors, and a source of alternating signal voltage and an output connected between the center tap of the reference source and a point between the reactors for cooperating with the reference source to saturate one of the reactors to provide pulses at the output in accordance with the signal.

4. A circuit for forming pulses in accordance with a signal comprising a pair of saturable reactors, an alternating reference voltage source connected to the reactors for energizing the reactors in the same phase relationship and a source of alternating signal voltage connected to the reactors for energizing the reactors in phase opposition and cooperating with the reference source to saturate one of the reactors in each half cycle of reference voltage to provide pulses at a time in each half cycle in accordance with the amplitude of the signal and of a plurality corresponding to the phase of the signal relative to the reference voltage.

5. A circuit for forming pulses in accordance with a signal comprising a pair of saturable reactors, a source of alternating voltage connected to the reactors for energizing the reactors in the same phase relationship and a source of alternating signal voltage connected to the reactors for energizing the reactors in phase opposition and cooperating with the reference source to saturate one of the reactors in each half cycle of reference voltage to provide pulses for a period in each half cycle in accordance with the amplitude of the signal and of a polarity corresponding to the phase of the signal relative to the reference voltage.

6. A circuit for forming pulses in accordance with a signal comprising a pair of saturable reactors, a source of alternating reference voltage connected to the reactors for energizing the reactors in the same phase relationship and a source of alternating signal voltage connected to the reactors for energizing the reactors in phase opposition and cooperating with the reference source to saturate one of the reactors in each half cycle of reference voltage to provide pulses at a time and for a period in each half cycle in accordance with the amplitude of the signal and of a polarity corresponding to the phase of the signal relative to the reference voltage.

7. A circuit for forming pulses in accordance with a signal comprising a pair of saturable reactors, a center-tapped source of alternating reference voltage connected in series with the saturable reactors for energizing the reactors substantially to saturation, and a source of signal voltage and an output connected between the center tap of the reference source and a point between the reactors for cooperating with the reference source to saturate one of the reactors at a time in each half cycle of reference voltage in accordance with the signal.

8. A circuit for forming pulses in accordance with a signal comprising a pair of saturable reactors, a center-tapped source of alternating reference voltage connected in series with the saturable reactors for energizing the reactors substantially to saturation, and a source of signal voltage and an output connected between the center tap of the reference source and a point between the reactors for cooperating with the reference source to saturate one of the reactors for a period in each half cycle of reference voltage in accordance with the signal.

9. A circuit for forming pulses in accordance with a signal comprising a pair of saturable reactors, a center-tapped source of reference voltage connected in series with the saturable reactors for energizing the reactors substantially to saturation, and a source of signal voltage and an output connected between the center tap of the reference source and a point between the reactors for cooperating with the reference source to saturate one of the reactors at a time and for a period at each half cycle of reference voltage in accordance with the signal.

10. A circuit for forming pulses in accordance with a signal, comprising two circuit loops each including a saturable reactor and a portion of a reference source and having in common a source of signal voltage and a load, the source of reference voltage in the absence of a signal energizing the reactors equally so that no current flows through the common portion of the loops and the load is deenergized, and the source of reference voltage and the source of signal voltage in the presence of a signal energizing the reactors unequally so that current flows through the common portion of the loops and energizes the load in accordance with the signal.

11. A circuit for forming pulses in accordance with a signal, comprising two circuit loops each including a saturable reactor and a portion of a reference source and having in common a source of signal voltage and a load, the source of reference voltage in the absence of a signal energizing the reactors equally so that no current flows through the common portion of the loops and the load is deenergized, and the source of reference voltage and the source of signal voltage in the presence of a signal saturating one of the reactors at a time in each half cycle of reference voltage in accordance with the signal so that corresponding current flows through the common portion of the loops and energizes the load.

12. A circuit for forming pulses in accordance with a signal, comprising two circuit loops each including a saturable reactor and a portion of a reference source and having in common a source of signal voltage and a load, the source of reference voltage in the absence of a signal energizing the reactors equally so that no current flows through the common portion of the loops and the load is deenergized, and the source of reference voltage and the source of signal voltage in the presence of a signal saturating one of the reactors for a period of each half cycle of reference voltage in accordance with the signal so that corresponding current flows through the common portion of the loops and energizes the load.

13. A circuit for forming pulses in accordance with a signal, comprising two circuit loops each including a saturable reactor and a portion of a reference source and having in common a source of signal voltage and a load, the source of reference voltage in the absence of a signal energizing the reactors equally so that no current flows through the common portion of the loops and the load is deenergized, and the source of reference voltage and the source of signal voltage in the presence of a signal saturating one of the reactors at a time and for a period in each half cycle of reference voltage in accordance with the signal so that corresponding current flows through the common portion of the loops and energizes the load.

References Cited by the Examiner
UNITED STATES PATENTS

| | | | |
|---|---|---|---|
| 2,627,594 | 2/53 | Sawyer et al. | 318—202 |
| 2,824,976 | 2/58 | Weinberg et al. | 307—88 |
| 2,883,563 | 4/59 | Sunderlin | 307—88 |

IRVING L. SRAGOW, *Primary Examiner.*